US012028327B2

(12) United States Patent
Islam

(10) Patent No.: US 12,028,327 B2
(45) Date of Patent: Jul. 2, 2024

(54) AUTHENTICATION RISK-SCORING IN AN AUTHENTICATION SYSTEM BASED ON USER-SPECIFIC AND ORGANIZATION-SPECIFIC RISK MODELS

(71) Applicant: Okta, Inc., San Francisco, CA (US)

(72) Inventor: Tanvir Islam, Lake Stevens, WA (US)

(*) Notice: Subject to any disclaimer, the term of this patent is extended or adjusted under 35 U.S.C. 154(b) by 314 days.

(21) Appl. No.: 17/578,366

(22) Filed: Jan. 18, 2022

(65) Prior Publication Data

US 2023/0231837 A1    Jul. 20, 2023

(51) Int. Cl.
   *H04L 9/40*        (2022.01)
   *G06N 20/00*       (2019.01)
(52) U.S. Cl.
   CPC ............. *H04L 63/08* (2013.01); *G06N 20/00* (2019.01); *H04L 2463/082* (2013.01)
(58) Field of Classification Search
   CPC .... H04L 2463/082; H04L 63/08; G06N 20/00
   See application file for complete search history.

(56) References Cited

U.S. PATENT DOCUMENTS

| 11,575,680 | B1* | 2/2023 | Challey | G06N 20/00 |
| 2022/0417229 | A1* | 12/2022 | Sood | G06N 20/00 |
| 2023/0095415 | A1* | 3/2023 | Boyer | H04L 63/1408 726/23 |

* cited by examiner

*Primary Examiner* — Boris D Grijalva Lobos
(74) *Attorney, Agent, or Firm* — Hollard & Hart LLP

(57) ABSTRACT

An authentication system uses machine learning models to quantify a degree of risk that a given request to authenticate as a particular user of an organization is not in fact originating from that user, but rather from a malicious actor attempting to gain access to the user's account. More particularly, the authentication system employs both a user model that quantifies a degree of deviation from a user context in which a particular user typically requests authentication, and an organization model that quantifies a degree of deviation of a current context of the organization from a "normal" context for that organization. The user model and the organization can be employed individually, such as the organization model providing organization administrators with insights into the current security status of the organization, or together, such as using the risk scores of both models when assessing how to respond to a particular authentication request.

20 Claims, 2 Drawing Sheets

AUTHENTICATION RISK-SCORING IN AN AUTHENTICATION SYSTEM BASED ON USER-SPECIFIC AND ORGANIZATION-SPECIFIC RISK MODELS

FIELD OF ART

The present invention generally relates to the field of software systems, and more specifically, to quantifying risk of the presence of malicious actors when evaluating user authentication attempts.

BACKGROUND

Authentication systems authenticate the purported identity of a user wishing to gain access to a given electronic system. System characteristics such as accuracy, responsiveness, and ease of use tend to be countervailing considerations, with (for example) greater responsiveness or ease of use tending to produce markedly lower degrees of accuracy. It is difficult to design an authentication system that provides high degrees of each of these characteristics.

SUMMARY

An authentication system uses machine learning models to quantify a degree of risk that a given request to authenticate as a particular user of an organization is not in fact originating from that user, but rather from a malicious actor attempting to gain access to the user's account. More particularly, the authentication system employs both a user model that quantifies a degree of deviation from a user context in which a particular user typically requests authentication, and an organization model that quantifies a degree of deviation of a current context of the organization from a "normal" context for that organization. The user model and the organization can be employed individually, such as the organization model providing organization administrators with insights into the current security status of the organization and helping to identify and respond to denial of service attacks, or together, such as using the risk scores of both models when assessing how to respond to a particular authentication request.

The use of the models provides high degrees of accuracy, responsiveness, and ease of use. For example, the use of the user model and organization model may indicate that the current authentication request appears sufficiently low-risk that multi-factor authentication (MFA) need not be required in addition to a user password, thereby providing greater ease of use for the user. Additionally, the efficient techniques used for generating a score from the user model have low runtime overhead, increasing responsiveness.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
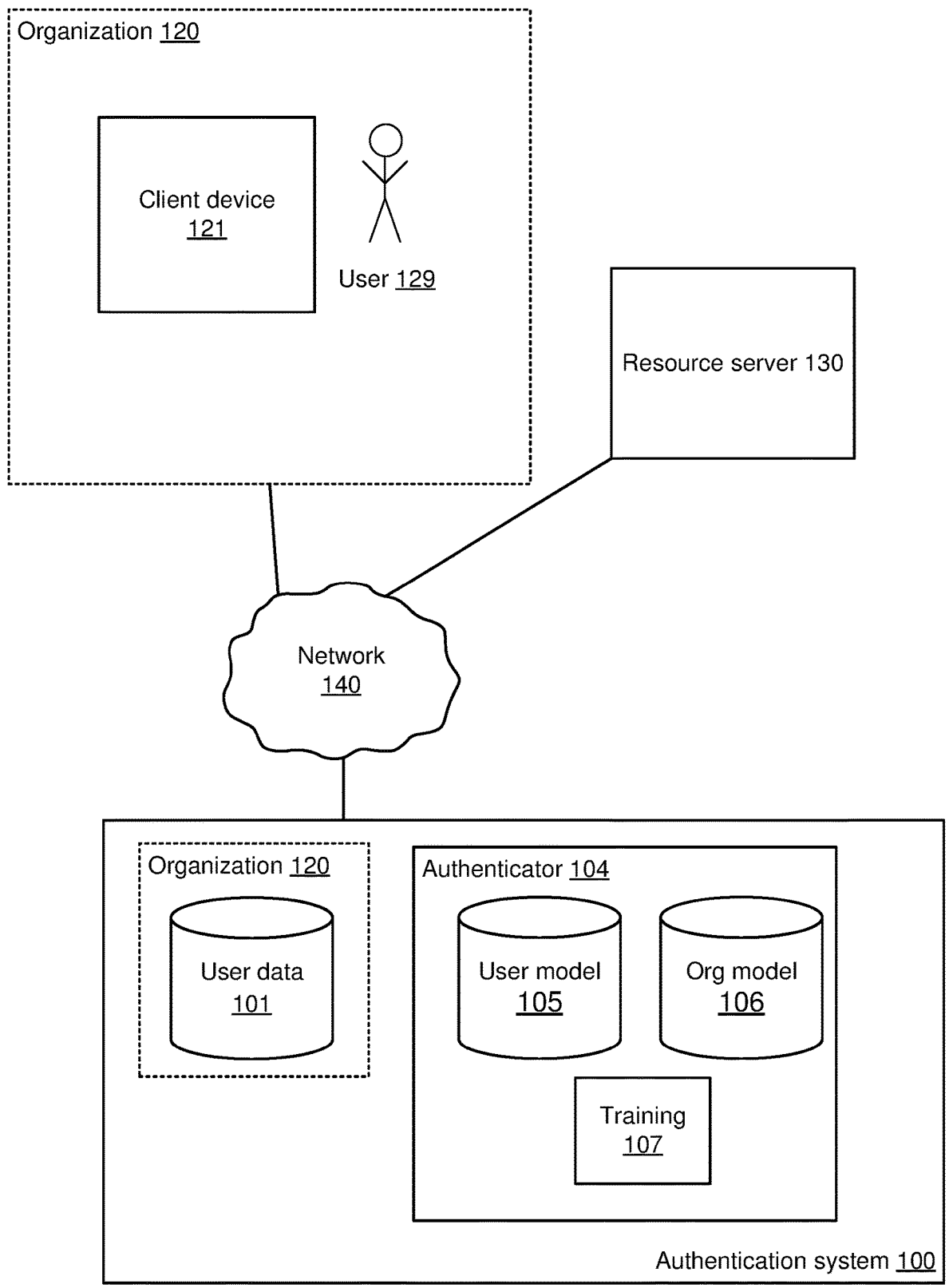
FIG. 1 illustrates one embodiment of a computing environment in which users use a client computing device to obtain access to authenticated resources over a network, according to some embodiments.

FIG. 1 illustrates one embodiment of a computing environment in which users use a client computing device to obtain access to authenticated resources over a network, according to some embodiments. The users are affiliated with an organization (e.g., employees or volunteers of the organization) and may access the resources on behalf of the organization. The users may have multiple accounts on different systems, and the resources that the users access may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.), databases, file systems, or the like. Such applications could be, for example, entirely web-based and accessible through a web browser, or could be accessible through a native application installed on the user's client device and communicating with a remote application server. Since each application or other resource could be from a different provider each of which could have a different identity for a user—a single user will typically have many different identities and associated credentials corresponding to the different resources that the user uses. However, for purposes of the invention, a user need only have a single account with a single corresponding identity. An authentication system verifies the identities of users and, if successfully verified, provides them with an authentication token that they can provide to a resource server as proof of their identity and hence of their permission to access requested resources. The authentication system may offer multi-factor authentication (MFA), such as one-time passwords (OTP), biometrics, or the like, in addition to a primary password. The entities of FIG. 1 are now described in more detail.

The organization 120 is an entity, such as a business, a school, a governmental agency, or the like, that has a number of affiliated users 129, such as employees or volunteers. One or more client devices 121 are registered to the users 129 by the organization 120 (or, in some embodiments, inferred from observation of past successful login patterns), and the users use the client devices 121 to access resources associated with the organization. Although for simplicity FIG. 1 illustrates only a single user 129 and client device 121, there may be any number of either.

The resource server 130 provides access a resource, such as a web-based application (e.g., MICROSOFT OFFICE 365™), a service, a database, a document, or the like. The resource server 130 may be on a server separate from the systems of the authentication system 100 or the organization 120, or it may be part of any of the other systems. The resource server 130 requires authentication of users before the users may gain access to any or all of its resources, and (in embodiments in which the resource server 130 is independent of the authentication system 100) the resource server 130 accepts tokens of authentication from the authentication system 100 as establishing user identity.

The authentication system 100 authenticates the identity of the user 129, granting the user some proof of authentication, such as an authentication token, upon successful verification. The authentication system 100 stores user data 101 that include a set of identities of known users with accounts on the authentication system 100. The user data 101 may include a form of identity on the authentication system 100 such as a username, as well as other credential data associated with a user, such as a user password and/or information derived therefrom (such as an encrypted form of the password). The user data 101 may also include many other types of data about users, such as the factor types and providers that the users may use when seeking identity verification from the authentication system 100, their role(s) or group(s) within the organization 120 to which they belong (e.g., "Engineering", "Legal", "Manager 2", "Director", or the like), and/or the resources to which they have access (e.g., third-party applications 110 such as SALESFORCE, MICROSOFT OFFICE 365, SLACK, or the like), as some examples. The user data 101 may also include identities and credentials of the various users on the various accounts to which they have access, thereby linking a user's identity on the authentication system 100 to the user's identities on those different accounts and (by extension) permitting access to those accounts. In some embodiments, the authentication system 100 is part of the organization 120, rather than being an independent entity as it is in other embodiments. In some embodiments, the authentication system 100 is a multi-tenant system, supporting multiple organizations 120 that serve as tenants of the system. In such embodiments, there is one instance of each of the organization-specific components (e.g., the user data 101, user model 105, and organization model 106) for each tenant organization.

In some embodiments, software on the client device 121 facilitates user authentication by securely and transparently communicating with the authentication system 100 that primarily handles the authentication, and by providing any resulting authentication tokens to a resource server 130 whose resources the user is attempting to access. In this way, the users of the organization 120 simply and securely obtain access to the resources that they need. Such software on the client device 121 may (although need not) be provided by the entity responsible for the authentication system 100. In some embodiments, the software is an authenticator application, a locally-installed application. In such embodiments, the authenticator application may have a graphical user interface that the user 129 uses to specify data used to authenticate the user to the authentication system 100. For instance, the authenticator application could display text fields or other data entry areas for specifying a username and password of the user 129, a drop-down list or other menu of types of MFA factors to use for authentication (e.g., biometrics, physical tokens, push notifications, or OTP), or the like. Based on the data and/or selections specified by the user 129 in the user interface, the authenticator application communicates with the authentication system 100 to authenticate the user on the authentication system 100. In other embodiments, the authenticator application is implemented as a plugin for another application.

In some embodiments, the authentication system 100 includes single sign-on (SSO) functionality that—once the user has been authenticated—allows the authentication system to transparently log a user in to the different accounts or other resources to which the user has access. For example, for a given user who has logged in to the authentication system 100, the authentication system can look up the user's accounts or other resources within the user data 101, as well as the user's credentials for those accounts. Using the credentials, as well as metadata or other information about the accounts, authentication system 100 can automatically log the user into the applications or other resources described in the user data 101, such as by establishing application sessions with the various applications and providing corresponding session data (e.g., session tokens) to the device 121. Thus, with a single login to the authentication system 100, the SSO functionality of the authentication system provides a user with automatic access to all the user's accounts or other resources.

The authentication system 100 has an authenticator module 104 that handles the details of authenticating that a particular authentication request does indeed correspond to the purported user. In particular, the authenticator module 104 uses user models 105 (each corresponding to a particular user of an organization), and/or an organization model 106. In embodiments in which the authentication system 100 supports multiple organizations, there is one set of user models, and one organization model 106, for each of the organizations. In some embodiments, the authenticator module 104 further includes a training module 107 that trains the user model 105 and organization model 106 given information about prior authentication requests.

User Model

The user model 105—once established for a given user—is used to compute a user score that quantifies a degree of deviation of the context of a particular request from a normal user context in which a particular user typically requests authentication. The input to the user model 105 includes features associated with the context in which an authentication request to be evaluated is taking place. For example, in some embodiments the features include information about the client device 121 from which the authentication request originates (e.g., the device type (desktop/mobile/tablet, etc.), the operating system running on the client device, the browser (version/subversion) installed on the client device, the MAC address of the client device, data from a cookie stored on the client device, an indicator of a geolocation (e.g., a postal code) from which the request originates, the set of the unique IP addresses assigned to the client device), and/or information about the authentication request (e.g., an IP address or other network address from which the request originates, whether a proxy is being used). Other examples of features are features parsed from sources such as the HTTP User Agent string (e.g., http_header_accept_language, with combinations such as 1. en-ZA;q=1.0, de-ZA;q=0.9, af-ZA;q=0.8, 2. en-GB,en-JM;q=0.9, en-US;q=0.8, en;q=0.7 when tokenized, and which may further be vectorized and then transformed to an embedding, which results in features that are far easier to work with than raw logfile strings), or JavaScript fingerprint (e.g., screen resolution, keyboard language). The features may come from different sources, such as certain ones of the features being provided by software on the client device 121, and others of the features being inferred by the authentication system 100 from network information, such as HTTP headers. There may be any number (e.g., hundreds) of features after tokenization. Accordingly, the number of combinations of the different values of each feature for prior user authentication requests may be large. As one specific example, a particular user may have authenticated in the past using a Mac™ client device, a Windows™ 10 client device, and an Android™ smartphone, including both the Safari™ and Chrome™ browsers, from different locations including work, home, and hotels from various business trips. The number of combinations of values that the user used for just those three features (e.g., <OS=Mac, Browser=Safari, Location=Work>, <OS=Mac, Browser=Chrome, Location=Work>, <OS=Android, Browser=Chrome, Location=Work>, <OS=Android, Browser=Chrome, Location=Home>, <OS=Android, Browser=Chrome, Location=Work>, <OS=Android, Browser=Chrome, Location=Hotel$_1$>, <OS=Android, Browser=Chrome, Location=Hotel$_2$>, . . . ) could be substantial; the number of used combinations for hundreds of features can become quite large (e.g., many thousands).

In some embodiments, the user model 105 is a neural network. In one embodiment, the user model 105 is trained (e.g., by the training module 107) on the features of positive combinations that represent past authentication requests that were ultimately considered to be considered successful by the authentication system to which the requests were submitted (e.g., the authentication system 100), or some subset thereof, such as all successful requests that were verified via MFA. Negative training samples may be derived by (for example) randomly modifying one or more of the feature values of a combination from the positive training and verifying that the result is not present in the list of used combinations, or by selecting a combination at random from the positive training set of another user (on the assumption that that combination has likely not been used by the present user). The tokenized features in the corpus can be considered as "words" as used in Natural Language Processing, and are then indexed or vectorized. These index values in the training samples are fed to embedding layer. Note that after the embedding layer, many additional layers can be added and the architecture of the final neural network can be customized. The prediction target is simply positive vs negative user profile and becomes a binary classification problem; thus, binary cross-entropy loss is used to train the neural network. The prediction output is simply a score between 0 and 1. Also note that it could be possible that during run-time prediction, there may be out-of-vocabulary tokens not available in the training corpus (e.g. new form of attacks or requests originating from different source). In this scenario, certain or all features cannot not be indexed in a feature sequence based on the training corpus. As such, applying a threshold will automatically mark the authentication request as high risk.

The neural network has an embedding layer that tends to reduce the dimensionality of discrete categorical features and transform them into latent vector representations. Additional layers added sequentially after the embeddings layer classify whether, or to what extent, the authentication request represented by given input features appears to be genuine—that is, originating with the user to be authenticated, as opposed to someone else masquerading as the user.

The use of a machine-learned model, such as a neural network, allows efficient processing—and hence reduced latency for the user—when determining whether to grant a particular user authentication request. As noted previously, the number of used combinations of feature values for the many possible features may in practice be quite large, such as many thousands of combinations. In contrast to the use of a machine-learned model, another approach could be to simply store, for each user, a list of all the combinations of feature values that the user has used. However, checking the combination of feature values for the current requests to see whether it matches any of the used combinations in the list stored for the user associated with the authentication request has a processing complexity that is linear (O(n)) with respect to the number of combinations in the list, and it requires maintaining a user table with all the combinations, which can become very difficult at run time when accounting for all users. Application of the machine-learned model, in contrast, produces a result more quickly in the (typical) case of a long list of used combinations and does not require maintaining a user table. Another alternative to the use of machine-learned models that produces a result with less computation than searching a list of used combinations is searching of used values for individual features, without respect to the values of other features. As a very simple example, if the list of used combinations of a particular user had the two combinations {<OS=Mac, Browser=Safari, Location=Work>, <OS=Android, Browser=Chrome, Location=Home>}, this alternative would store an indication that the possible values for operating system are "Mac" and "Android", for browser are "Safari" and "Chrome", and for location are "Work" and "Home". In this alternative, if any of these values is present for the corresponding feature, even if not in one of the used combinations (e.g., <OS=Mac, Browser=Firefox, Location=Office$_2$>, which is not a combination in the list of used combinations, but which does have the value "Mac" for the OS feature), then the requested authentication is granted. However, although this alternative typically requires less computation than searching a list of used prior combinations, it is of course less accurate and secure, since it grants access based on feature combinations that the associated user may not in fact previously have used.

Organization Model

The organization model 106 quantifies a degree of deviation of the current context of an organization from a context in which users of the organization 120 typically request authentication. The training module 107 generates the organization model 106 based on requests (e.g., authentication requests) sent to the authentication system 100 by all, or a subset of, the users 129 of the organization 120 over some time period, such as several weeks, a month, or the like, placing the samples into "buckets" of time. The organization model 106 indicates the "normal" state of the organization, as characterized by a number of aggregated features.

The aggregated features used to build the organization model 106 differ from those used to train the user model 105, and in some embodiments are real-valued numbers quantifying counts or average values (or other numerical statistical measures) of requests associated with the organization over the time period of the training set data. This is in contrast to the features of the user model 105, which are typically categorical variables. The aggregated features of the organization model 106 may include information about browser types, OS types, use of proxies, addresses or identities, origin cities, origin countries, and the like, such as total counts of instances of particular values (e.g., instances of the Firefox browser), or average instances per time of those particular values. In one embodiment, the aggregated features include the following: {'uncommon_device_rate', 'computer_device_rate', 'mobile_device_rate', 'tablet_device_rate', 'unknown_browser_rate', 'chrome_browser_rate', 'safari_browser_rate', 'iell_browser_rate', 'firefox_browser_rate', 'unknown_os_rate', 'windows7_os_rate', 'linux_os_rate', 'chrome_os_rate', 'mac_os_rate', 'unknown_raw_user agent_rate', 'tor_proxy_rate', 'proxy_rate', 'unique_ip_address_rate', 'unique actor_id_rate', 'unique_city_rate', 'unique_country_rate', 'uncommon_device_count', 'unknown_browser_count', 'unknown_os_count', 'unique_ip_address_count', 'unique actor_id_count', 'unique_city_count', 'unique_country_count'}, where the "X_rate" variables indicate the count of the variable X divided by the count of total successful logins.

The training set used to generate the organization model 106 includes the features for requests made of the authentication system 100 by users of the organization 120 during a time period believed to constitute normal operation (e.g., without a significant number of known attacks on the organization). The training set items include features associated with the requests, and which are combined into the aggregated features discussed above. For example, the 'safari_browser_rate' aggregated feature is formed based on the a "browser type" categorical feature—namely, counting all the training set items for which the "browser type" feature has the value "Safari" and dividing by the total number of training set items to obtain the rate.

In some embodiments, the aggregated features are first projected to a low dimensional space, such as with the Singular Value Decomposition method. A low dimensional hyperplane is then constructed by eigenvectors that capture the majority of the variance in the data; this hyperplane then serves as the baseline organization model 106. The authenticator module 104 can compute an organizational score for the present state of the organization by computing the aggregated features over some recent period of time ending at or near the present moment (and being of the same time period length as used for training), and then comparing these current aggregated features with the aggregated features making up the organization model 106 that represents a "normal" state of the organization. (After normalization, the score is between 0 and 1.) More specifically, the "current" aggregated features are processed in the same manner as the aggregated features that were used to produce the organization model 106 (e.g., by computing a new input projection on the eigenvectors) so that the two sets of features are comparable, and then by computing the organization score based on the comparison of the two processed sets (namely, computing a Euclidean distance, then normalizing the distance to produce a score between 0 and 1). For example, the organization score may be computed by summing the weighted Euclidean distances between a point in the eigenvector's projection space for the aggregated features of the organization model 106 and between a computed hyperplane for the aggregated features of the "current" organization state.

Greater organization risk scores represent greater degrees of deviation from the "normal" baseline behavior of the organization 120. One common reason for such deviation is attempted malicious intrusions, such as coordinated authentication attempts by those that are not registered users of the organization 120. The following are several example scenarios of several such attacks, and how the use of the organization model 106 to compute an organization score can detect the attacks:

Scenario 1 (OS Context): Organization A has strict IT policy in which it has provisioned Mac laptops to most of its employees and Windows laptops only to its finance department (a fraction of its overall user base). In an attack scenario, the attackers mostly use Windows devices to attack Organization A. The authenticator module 104, which has been continuously updating aggregated features for Organization A, compares these current aggregated features (or derived versions thereof) to the organization model 106, computing that the organization score is relatively high (due to the discrepancy between the OS type-oriented aggregated features of the current organization state relative to those of the organization model 106).

Scenario 2 (Browser Context): Organization B users primarily use the Chrome browser in their day-to-day work. In one attack scenario, Chrome browser use rates drop, and use rates of other browsers spiked. A relatively high organization score is computed due to the discrepancies in the browser type usage-oriented features.

Scenario 3 (Geography Context): Organization C's customer base is located in the United State and Europe, spreading over roughly 100 cities. In one attack scenario, the authentication requests are coming from approximately 400 cities, significantly higher than the typical 100 cities. A relatively high organization score is computed due to the discrepancies in the numbers of distinct locations from which the authentication requests are originating.

Applications of Model Scoring

The authenticator module 104 uses the user model 105 and/or the organization model 106 to compute a risk score for an authentication request associated with a user of an organization. As noted, the organization score is computed based on a comparison of the organization model 106 and the "current" state of the organization and represents the degree to which the current (recent) state of the organization 120 differs from the baseline represented by the organization model 106, potentially signaling attacks on the organization. The particular manner in which the authentication system 100 proceeds with requested authentications, or otherwise uses the organization score, may differ in different embodiments.

In some embodiments, the organization score for the organization computed using the organization model 106 is used in combination with the user score computed using the user model 105 to determine whether, and/or in what manner, to allow the authentication request to proceed. For example, the two scores may be combined into one as a linear combination and compared to a particular threshold combined score to determine a degree of risk of the request. Alternatively, they may be used separately, such as by determining whether the organization score for the organization is above a particular first threshold, and/or whether the user score is above a particular second threshold. As one example of a response to the score, in some embodiments the authenticator module 104 requires the use of MFA, in addition to the primary credentials (e.g., password), if the combined score, and/or either of the two individual organization or user scores, are above a given threshold of risk, but does not require the use of MFA if the risk score(s) is sufficiently low.

In some embodiments, the authentication system 100 presents the organization risk score for an organization to certain of the organization's users (e.g., administrators), such as a within a dashboard user interface that shows organization risk scores over time, or by sending a message (e.g., email or SMS) to communicate the organization score those users if the organization score is sufficiently high as to indicate substantial risk. In some embodiments, the organization risk score is also provided to the authentication system 100 for use by the authenticator module 104.

In some embodiments, in response to a high computed organization score for a given organization 120, the authentication system 100 takes proactive remedial measures to increase the security of the organization, such as by employing IP blocking (e.g., for authentication requests from IP addresses not within a known set of IP addresses associated with the organization), captchas, and/or rate limiting. This can be useful for (among other things) responding to denial of service (DoS) attacks against the organization 120.

In some embodiments, the use of the organization score may advantageously compensate for the lack of a trained user model for a particular user (e.g., when the user is new and has not yet used the authentication system 100 enough for the authentication system to establish a baseline for the user). For example, if the current organization score for a particular organization indicates an extremely low degree of risk, then (for example) MFA may not be required, even if there is not yet a user model 105 with which to compute a user score for the current authentication request.

Physically, the organization 120 is made up of a number of computing systems, including the various client devices 121; one or more internal networks that connects the computing systems, including routers or other networking devices that define the boundary between the organization and external networks; and the like.

Similarly, the authentication system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
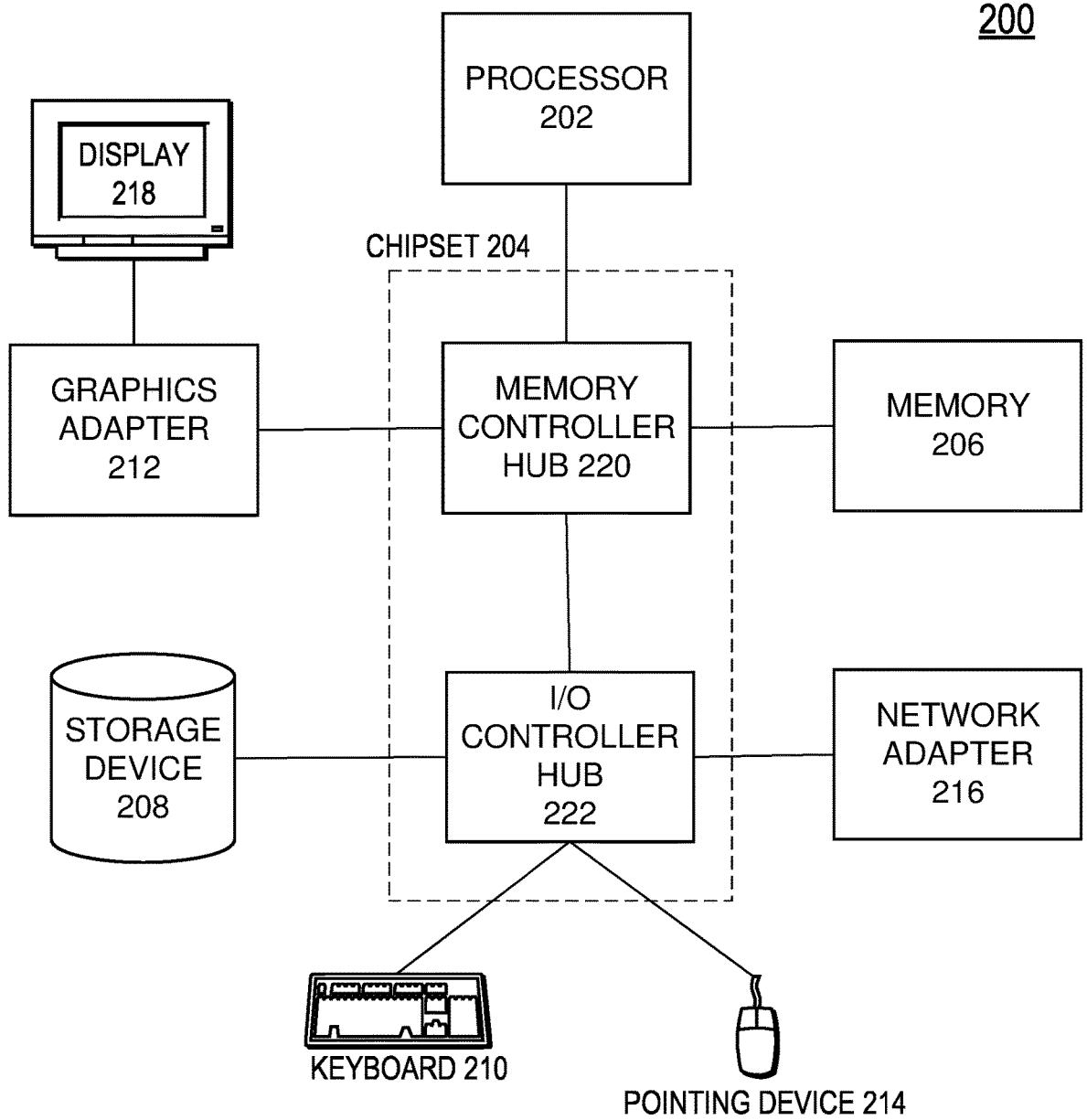
FIG. 2 is a high-level block diagram illustrating physical components of a computer used as part or all of (for example) the authentication system, the client device, and/or the resource server of FIG. 1, according to one embodiment.

FIG. 2 is a high-level block diagram illustrating physical components of a computer 200 used as part or all of (for example) the authentication system 100, the client device 121, and/or the resource server 130, according to one embodiment. Illustrated are at least one processor 202 coupled to a chipset 204. Also coupled to the chipset 204 are a memory 206, a storage device 208, a graphics adapter 212, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. In one embodiment, a computer 200 acting as a server may lack a graphics adapter 212, and/or display 218, as well as a keyboard 210 or pointing device 214. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for user authentication by a multi-tenant authentication system, the computer-implemented method comprising:
   for a tenant organization of the multi-tenant authentication system:
      training a user model that takes, as input, features of an authentication request associated with a user of the tenant organization, and that produces, as output, one or more user risk scores quantifying a degree of deviation of the input features from features of a normal authentication request context for that user;
      training an organization model that takes, as input, aggregated features associated with a current context of the tenant organization, and that produces, as output, one or more organization scores quantifying a degree of deviation of the aggregated features associated with the current context of the tenant organization from aggregated features associated with a normal state of the tenant organization, the current context associated with a time at which a respective request is received;
      receiving a first request to authenticate a first user of the tenant organization, and features associated with the first request to authenticate the first user;
      computing a user risk score for the first request by providing the features associated with the first request to the user model corresponding to the first user;
      computing an organization score for the tenant organization by providing aggregated features associated with a current state of the tenant organization to the organization model corresponding to the tenant organization; and
      using the user risk score in combination with the organization score to determine how to respond to the first request to authenticate the first user.

2. The computer-implemented method of claim 1, wherein the features that are input to the user model comprise at least one of: a categorical variable about a client device of the user associated with the user model, or a categorical variable about the authentication request associated with the user.

3. The computer-implemented method of claim 1, wherein the aggregated features that are input to the organization model comprise real-valued statistical measures of features aggregated over a plurality of requests associated with the tenant organization.

4. The computer-implemented method of claim 1, wherein determining how to respond to the first request to authenticate the first user comprises: responsive to at least one of the user risk score or the organization score exceeding a given threshold of risk, requiring the first user to use multi-factor authentication (MFA) for the first request.

5. The computer-implemented method of claim 1, further comprising:
   responsive to the organization score exceeding a given threshold of risk, communicating the organization score to an administrator.

6. The computer-implemented method of claim 1, further comprising:
   responsive to at least one of the organization score or the user risk score exceeding a given threshold of risk, performing at least one of internet protocol (IP) blocking, rate limiting, or use of captchas.

7. The computer-implemented method of claim 1, wherein:
   training the user model comprises training a neural network on features of past authentication requests that successfully satisfied MFA.

8. The computer-implemented method of claim 1, wherein:
   training the organization model comprises constructing a low dimensional hyperplane for aggregated features of requests associated with the tenant organization during a prior time period.

9. The computer-implemented method of claim 1, further comprising deriving the features associated with the first request in part by:
   tokenizing an HTTP string associated with the first request into components;
   vectorizing the components; and
   embedding the vectorized components.

10. An authentication system for user authentication by a multi-tenant authentication system, the authentication system comprising:
    a computer processor; and
    a non-transitory computer-readable storage medium storing instructions that when executed by the computer processor perform actions comprising:
       for a tenant organization of the authentication system:
          training a user model that takes, as input, features of an authentication request associated with a user of the tenant organization, and that produces, as output, one or more user risk scores quantifying a degree of deviation of the input features from features of a normal authentication request context for that user;

training an organization model that takes, as input, aggregated features associated with a current context of the tenant organization, and that produces, as output, one or more organization scores quantifying a degree of deviation of the aggregated features associated with the current context of the tenant organization from aggregated features associated with a normal state of the tenant organization, the current context associated with a time at which a respective request is received;

receiving a first request to authenticate a first user of the tenant organization, and features associated with the first request to authenticate the first user;

computing a user risk score for the first request by providing the features associated with the first request to the user model corresponding to the first user;

computing an organization score for the tenant organization by providing aggregated features associated with a current state of the tenant organization to the organization model corresponding to the tenant organization; and using the user risk score in combination with the organization score to determine how to respond to the first request to authenticate the first user.

11. The authentication system of claim 10, wherein the features that are input to the user model comprise at least one of: a categorical variable about a client device of the user associated with the user model, or a categorical variable about the authentication request associated with the user.

12. The authentication system of claim 10, wherein the aggregated features that are input to the organization model comprise real-valued statistical measures of features aggregated over a plurality of requests associated with the tenant organization.

13. The authentication system of claim 10, wherein determining how to respond to the first request to authenticate the first user comprises: responsive to at least one of the user risk score or the organization score exceeding a given threshold of risk, requiring the first user to use multi-factor authentication (MFA) for the first request.

14. The authentication system of claim 10, the actions further comprising:
responsive to the organization score exceeding a given threshold of risk, communicating the organization score to an administrator.

15. The authentication system of claim 10, the actions further comprising:
responsive to at least one of the organization score or the user risk score exceeding a given threshold of risk, performing at least one of internet protocol (IP) blocking, rate limiting, or use of captchas.

16. The authentication system of claim 10, wherein:
training the user model comprises training a neural network on features of past authentication requests that successfully satisfied MFA.

17. The authentication system of claim 10, wherein:
training the organization model comprises constructing a low dimensional hyperplane for aggregated features of requests associated with the tenant organization during a prior time period.

18. A non-transitory computer-readable storage medium storing instructions that when executed by a computer processor perform actions comprising:
for a tenant organization of an authentication system:
training a user model that takes, as input, features of an authentication request associated with a user of the tenant organization, and that produces, as output, one or more user risk scores quantifying a degree of deviation of the input features from features of a normal authentication request context for that user;

training an organization model that takes, as input, aggregated features associated with a current context of the tenant organization, and that produces, as output, one or more organization scores quantifying a degree of deviation of the aggregated features associated with the current context of the tenant organization from aggregated features associated with a normal state of the tenant organization, the current context associated with a time at which a respective request is received;

receiving a first request to authenticate a first user of the tenant organization, and features associated with the first request to authenticate the first user;

computing a user risk score for the first request by providing the features associated with the first request to the user model corresponding to the first user;

computing an organization score for the tenant organization by providing aggregated features associated with a current state of the tenant organization to the organization model corresponding to the tenant organization; and using the user risk score in combination with the organization score to determine how to respond to the first request to authenticate the first user.

19. The non-transitory computer-readable storage medium of claim 18, wherein the features that are input to the user model comprise at least one of: a categorical variable about a client device of the user associated with the user model, or a categorical variable about the authentication request associated with the user.

20. The non-transitory computer-readable storage medium of claim 18, wherein the aggregated features that are input to the organization model comprise real-valued statistical measures of features aggregated over a plurality of requests associated with the tenant organization.

* * * * *